(12) United States Patent
Krause-Leipoldt et al.

(10) Patent No.: US 11,009,835 B2
(45) Date of Patent: May 18, 2021

(54) SIMPLIFIED PARAMETERIZATION OF A DRIVE CONTROLLER

(71) Applicant: Siemens Aktiengesellschaft, Munich (DE)

(72) Inventors: Tammo Krause-Leipoldt, Baiersdorf (DE); Harald Wegmann, Herzogenaurach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/979,064

(22) PCT Filed: Feb. 21, 2019

(86) PCT No.: PCT/EP2019/054342
§ 371 (c)(1),
(2) Date: Sep. 8, 2020

(87) PCT Pub. No.: WO2019/170430
PCT Pub. Date: Sep. 12, 2019

(65) Prior Publication Data
US 2020/0409315 A1    Dec. 31, 2020

(30) Foreign Application Priority Data
Mar. 9, 2018    (EP) .................................. 18160847

(51) Int. Cl.
*G05B 11/01*    (2006.01)
*G05B 15/02*    (2006.01)

(52) U.S. Cl.
CPC .............. *G05B 11/01* (2013.01); *G05B 15/02* (2013.01)

(58) Field of Classification Search
None
See application file for complete search history.

(56) References Cited

U.S. PATENT DOCUMENTS

| 9,337,707 B2 * | 5/2016 | Dixon .................... H02K 11/33 |
| 2005/0114590 A1 * | 5/2005 | Klier ..................... G06F 9/4411 |
| | | 711/111 |

(Continued)

FOREIGN PATENT DOCUMENTS

| CN | 103279124 B | 4/2015 |
| DE | 10 2007 021 146 A1 | 11/2008 |

OTHER PUBLICATIONS

PCT International Search Report and Written Opinion of International Searching Authority dated Jun. 12, 2019 corresponding to PCT International Application No. PCT/EP2019/054342 filed Feb. 21, 2019.

*Primary Examiner* — Ryan A Jarrett
(74) *Attorney, Agent, or Firm* — Henry M. Feiereisen LLC

(57) ABSTRACT

An electric drive includes a power component and an electric machine which is supplied with electrical energy via the power component. The power component is embodied as an inverter. When a starting condition is met, a drive controller for controlling the electric drive retrieves a configuration-specific parameter set from a data pool via a computer-to-computer interface, parameterizes itself in accordance with the retrieved parameter set and then determines control commands for the power component as a function of setpoint actuation states predefined for the drive controller, taking into account their parameterization, and actuates the power component accordingly. The setpoint actuation states are setpoint currents.

8 Claims, 3 Drawing Sheets

(56) References Cited

U.S. PATENT DOCUMENTS

| | | | |
|---|---|---|---|
| 2008/0004744 A1* | 1/2008 | Heinemann | G05B 19/0426 700/173 |
| 2009/0070575 A1* | 3/2009 | Ehlich | G05B 19/0423 713/2 |
| 2009/0160386 A1* | 6/2009 | Honda | F16H 61/0251 318/434 |
| 2010/0138035 A1 | 6/2010 | Fecht | |
| 2013/0131835 A1* | 5/2013 | Eckardt | H02M 1/44 700/11 |
| 2014/0198039 A1* | 7/2014 | Yayama | H02P 27/00 345/156 |

* cited by examiner

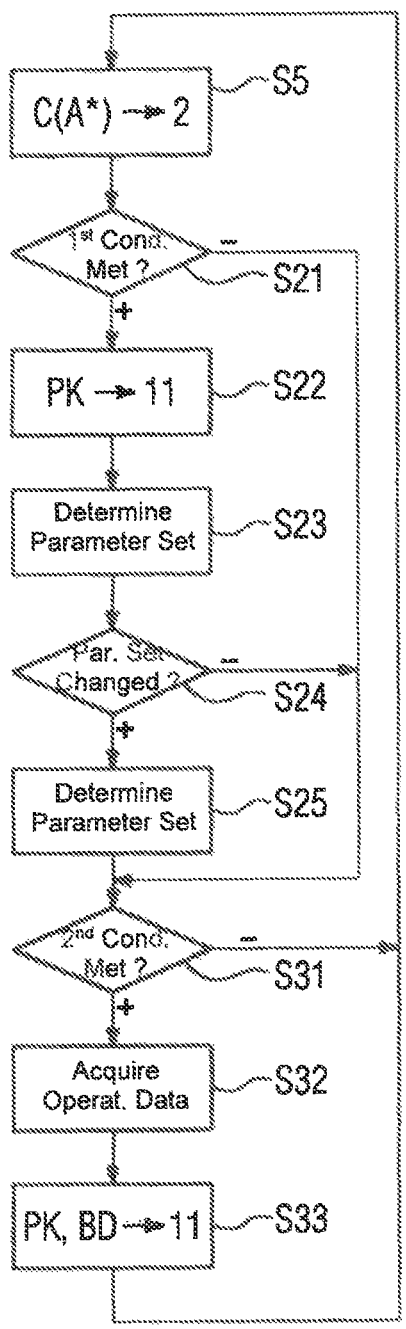

SIMPLIFIED PARAMETERIZATION OF A DRIVE CONTROLLER

CROSS-REFERENCES TO RELATED APPLICATIONS

This application is the U.S. National Stage of International Application No. PCT/EP2019/054342, filed Feb. 21, 2019, which designated the United States and has been published as International Publication No. WO 2019/170430 A1 and which claims the priority of European Patent Application, Serial No. 18160847.2, filed Mar. 9, 2018, pursuant to 35 U.S.C. 119(a)-(d).

BACKGROUND OF THE INVENTION

The present invention is based on an operating method for a drive controller for controlling an electric drive which comprises a power component embodied as an inverter and an electric machine which is supplied with electrical energy via the power component, wherein the drive controller determines control commands for the power component as a function of setpoint actuation states predefined for the drive controller, taking into account a parameterization determined by a parameter set, and actuates the power component accordingly, wherein the setpoint actuation states are setpoint currents.

The present invention is further based on a control program for a drive controller for controlling an electric drive which comprises a power component embodied as an inverter and an electric machine which is supplied with electrical energy via the power component, wherein the control program comprises machine code which can be processed by the drive controller, wherein the processing of the machine code by the drive controller causes the drive controller to execute such an operating method.

The present invention is further based on a drive controller for an electric drive which comprises a power component embodied as an inverter and an electric machine which is supplied with electrical energy via the power component, wherein the drive controller is embodied such that in operation it executes such an operating method, in particular is programmed with such a control program.

The present invention is further based on an electric drive,
wherein the electric drive comprises a power component embodied as an inverter and an electric machine which is supplied with electrical energy via the power component,
wherein the electric drive has such a drive controller, by which the power component is controlled.

Commissioning electric drives or drive controllers thereof is often complex and time-consuming. Furthermore, commissioning is often prone to error. This is particularly the case for larger systems in which a plurality of electric drives has to be commissioned. In addition, even in the case of formally correct commissioning, the parameterization of the electric drive is often not optimal and/or has to be amended in line with a changed operating situation or improved knowledge during the service life of the electric drive. Updating such parameterization is just as complex as the initial commissioning. There is therefore a need for a simple standardized way of commissioning electric drives, including the possibility of subsequent optimization.

In the prior art it is known for electric drives (or drive controllers thereof) to be parameterized in situ using software tools. In this case a plurality of parameters has to be amended application-specifically. The parameters are either amended individually manually or using prepared scripts. It is further known for a configuration engineer to forward such parameter sets to the manufacturer of the drive controllers, who then for their part parameterizes the drive controllers accordingly and delivers them in pre-parameterized form.

The advantage of the latter procedure is that the user is relieved of the commissioning work and the associated parameterization. However, it must be ensured that at each location in a larger system the "correct" drive is arranged with the "correct" drive controller. Furthermore, in this procedure too it is not easy to change a parameterization after it has been carried out.

A device and a method for managing flat objects is known from DE 10 2007 021 146 A1. The flat objects are transported via different conveying devices which are driven by drives. The drives are controlled by a control device.

The object of the present invention is therefore to create possibilities by means of which an optimum parameterization of the drive controllers of electric drives is possible in an easy and reliable manner.

SUMMARY OF THE INVENTION

According to one aspect of the invention, the object is achieved by an operating method as set forth hereinafter. Advantageous embodiments of the operating method form the subject matter of the dependent claims.

According to the invention an operating method for a drive controller for controlling an electric drive is created, wherein the electric drive comprises a power component embodied as an inverter and an electric machine which is supplied with electrical energy via the power component, wherein when a starting condition is met the drive controller retrieves a configuration-specific parameter set from a data pool via a computer-to-computer interface, parameterizes itself in accordance with the retrieved parameter set and then the power component determines control commands for the power component as a function of setpoint actuation states predefined for the drive controller, taking into account their parameterization, and actuates the power component accordingly, wherein the setpoint actuation states are setpoint currents.

As a result it is possible to store just one configuration identifier in the drive controller, wherein the configuration identifier is a uniquely individually assigned identifier—in other words a type of "fingerprint"—which identifies the associated electric drive and the drive controller. It is therefore possible to store the configuration-specific data set (=parameter set) under the corresponding configuration identifier in the data pool and to trace it in the data pool, based on the configuration identifier, and retrieve it from the data pool.

The retrieval of the parameter set can be triggered by different starting conditions. For example, the starting condition can be met by the drive controller being connected to its energy supply, by the drive controller being connected to the data pool via the computer-to-computer interface or by no parameter set yet being stored in the drive controller. Accordingly the configuration-specific parameter set is thus retrieved from the data pool by connecting the drive controller to its energy supply, by connecting the drive controller to the data pool or by the drive controller not yet being parameterized.

In the simplest case it is known beforehand which electric machine is supplied with electrical energy by the power component. In this case the parameter set can be retrieved directly from the data pool. In other cases characteristics data of the electric machine is known to the drive controller before the parameter set is retrieved. In this case the retrieved parameter set can be characteristics-data-dependent. In particular, multiple parameter sets can be stored in the data pool for the drive controller, wherein using the characteristics data of the electric machine it is determined which of these parameter sets is retrieved from the data pool.

In a preferred embodiment of the operating method the drive controller checks from time to time via the computer-to-computer interface whether a new configuration-specific parameter set is stored for it in the data pool. Should this be the case, the drive controller retrieves the new configuration-specific parameter set from the data pool via the computer-to-computer interface, parameterizes itself in accordance with the newly retrieved parameter set and then actuates the power component as a function of the setpoint actuation states predefined for the drive controller, taking into account their new parameterization. Using this procedure it is possible to automatically keep the parameterization of the drive controller up to date and to amend it to changed circumstances.

In a further preferred embodiment of the operating method the drive controller acquires operating data of the electric drive from time to time and stores it in the data pool via the computer-to-computer interface. If required the operating data can also comprise—in part or in full—the parameters of the parameter set. By storing the operating data it is firstly possible for the data pool to construct a history of the operation of the drive controller, for example for documentation purposes. Secondly it is possible for the stored operating data to be evaluated by the data pool and as a result for example for the basis to be created for an optimization of the parameter set.

According to another aspect of the invention, the object is achieved by a control program configured to cause the drive controller to execute an operating method according to the invention.

According to yet another aspect of the invention, the object is further achieved by a drive controller drive controller embodied such that it executes an operating method according to the invention. In particular the drive controller can be programmed with a control program according to the invention.

According to still another aspect of the invention, the object is further achieved by an electric drive which includes a power component and a drive controller according to the invention to control the power component.

BRIEF DESCRIPTION OF THE DRAWING

The afore-described properties, features and advantages of this invention as well as the manner in which they are achieved will become clearer and more comprehensible in conjunction with the following description of the exemplary embodiments, which are explained in more detail in conjunction with the drawings, which show, in a schematic representation.

DETAILED DESCRIPTION OF PREFERRED EMBODIMENTS

Figure 1:
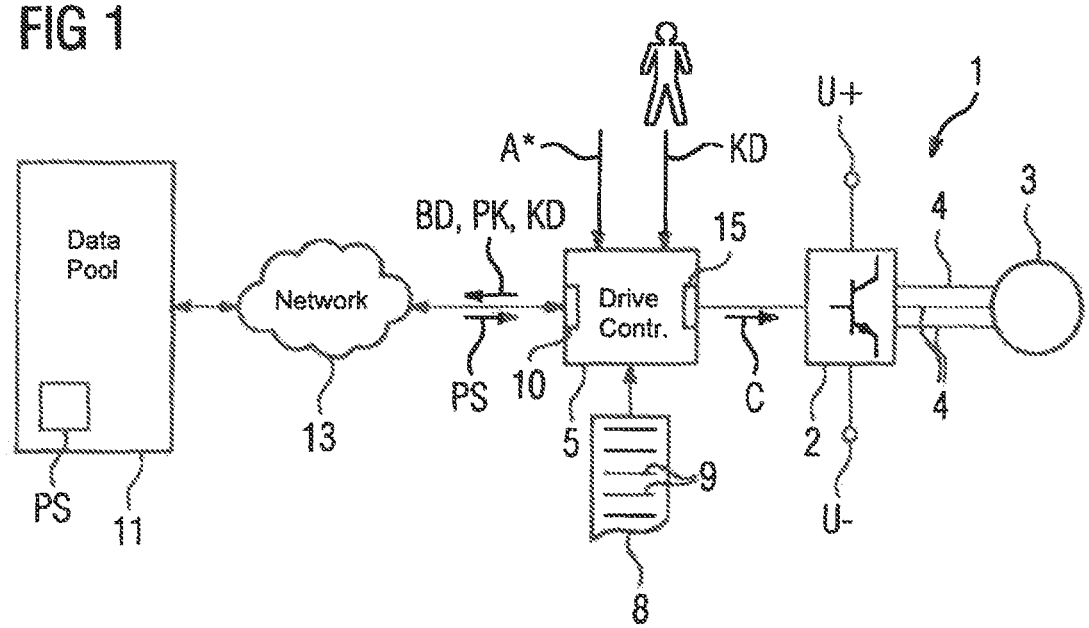
FIG. 1 an electric drive, a data network and a data pool,
FIG. 2 a drive controller,
FIG. 3 a flow diagram,
FIG. 4 a further flow diagram and
FIG. 5 a further flow diagram.

According to FIG. 1 an electric drive 1 has a power component 2. An electric machine 3 of the electric drive 1 is supplied with electrical energy via the power component 2. A direct assignment of the power component 2 to the electric machine 3 exists. The power component 2 thus exclusively supplies the electric machine 3 with electrical energy, not other devices in addition.

The power component 2 is embodied as an inverter. It can for example have IGBTs as electronic switching elements. If required a high potential U+ or a low potential U− can be connected to phases 4 of the electric machine 3 via the electronic switching elements for example and thus the electric machine 3 is supplied with current.

The electric drive 1 is controlled by a drive controller 5. The drive controller 5 is part of the electric drive 1. There is therefore a one-to-one assignment of the drive controller 5 to the power component 2. The drive controller 5 therefore controls the power component 2, but not other devices in addition. Instead, this relates to the so-called control unit of the inverter, which determines the control commands for the individual electronic switching elements of the inverter and outputs them to the electronic switching elements of the inverter.

Figure 2:
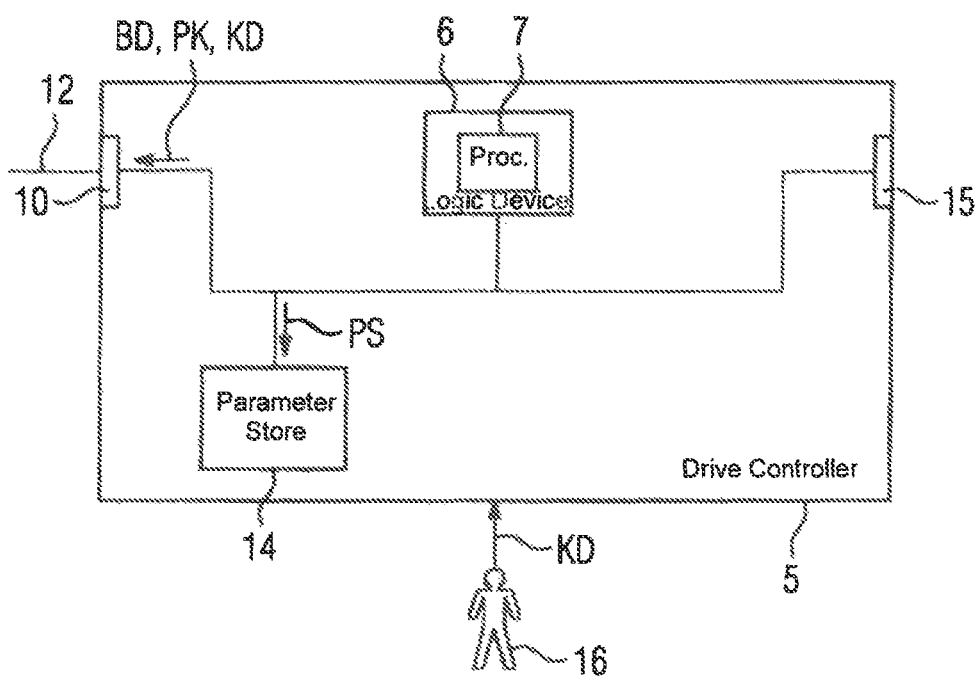

The drive controller 5 has a logic device 6 as per FIG. 2. The logic device 6 generally comprises a processor 7. It may additionally also comprise permanently programmed components such as for example ASICs and components wired by programming such as for example FPGAs (field programmable gate arrays) or PLAs (programmable logic arrays).

The drive controller 5 is embodied such that it executes an operating method which is explained in greater detail below in connection with FIG. 3. The drive controller 5 can for this purpose in particular be programmed with a control program 8. In this case the control program 8 comprises machine code 9 which can be processed by the drive controller 5—or, to be more precise, by the logic device 6 thereof. In this case the processing of the machine code 9 by the drive controller 5 causes the drive controller 5 to execute the corresponding operating method.

In connection with the operating method the drive controller 5 first checks in a step S1 whether a starting condition is met. The starting condition can for example consist in the drive controller 5 being connected to its energy supply. In this case the operating method is executed each time the drive controller 5 is again supplied with energy from the deenergized state. Alternatively or additionally it is possible for the starting condition to be that the drive controller 5 is connected to a data pool 11 via a computer-to-computer interface 10 (for example an RJ45 Interface, a WLAN connection or a Bluetooth connection). Here the drive controller 5 can for example check whether a connection cable 12 is plugged into the corresponding interface 10 or whether the corresponding wireless connection can be established. Alternatively the drive controller 5 can check whether a connection to a computer network 13 (for example the World Wide Web) exists via the interface 10 and if appropriate the connection cable 12. Again alternatively the drive controller 5 can check whether an access to the data pool 11 is possible via the interface 10 and the computer network 13. Alternatively or additionally it is possible for the starting condition to be that no parameter set is yet stored in the drive controller 5—specifically in a parameter store 14 of the drive controller 5.

In some embodiments of the present invention it is possible for step S1 to be executed until the starting condition is met or is present. In other embodiments step S1 is executed just once. If the starting condition is not met the system skips to a step S5, which is explained below.

If the starting condition is met, the drive controller 5 moves to a step S2. In step S2 the drive controller 5 forwards a configuration identifier PK to the data pool 11 via the computer-to-computer interface 10. The configuration identifier PK has been stored beforehand by a configuration engineer in the drive controller 5. An associated configuration-specific parameter set PS is determined within the data pool 11 based on the configuration identifier PK. The parameter set PS has—together with the configuration identifier PK—been stored beforehand by the configuration engineer in the data pool 11. The configuration-specific parameter set PS is forwarded to the drive controller 5 and received by the drive controller 5 in a step S3. As a result the drive controller 5 thus retrieves the configuration-specific parameter set PS via the computer-to-computer interface 10. In particular the drive controller 5 stores the parameter set PS in the parameter store 14. In a step S4 the drive controller 5 parameterizes itself in accordance with the retrieved parameter set PS. The parameterization as such can sometimes take place by storing the parameter set PS in the parameter store 14. Alternatively it may entail an autonomous operation different from storage in the parameter store 14.

Content and scope of the parameter set PS can be determined as required. For example, the following parameters can be defined by the parameter set PS: a setpoint speed, a maximum speed, a maximum current, a setpoint voltage, a rated voltage, a maximum voltage, a pulse frequency, an output frequency and ramp-up times and ramp-down times for a ramp function generator, i.e. resulting in an acceleration ramp and a brake ramp.

In step S5 the drive controller 5 executes a normal operation. In normal operation the drive controller 5 receives setpoint actuation states A*, from these determines control commands C for the power component 2, taking into account their parameterization, and actuates the power component 2 in accordance with the determined control commands C. The setpoint actuation states A* are setpoint currents.

Figure 3:
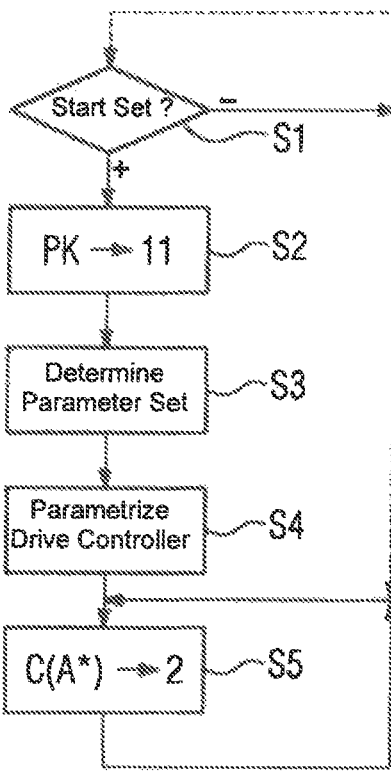

The procedure in FIG. 3 is advantageous if characteristics data of the electric machine 3 is already known from the configuration of the electric drive 1. If conversely this is not the case, the procedure in FIG. 3 can be configured differently.

Thus it is for example possible for the drive controller 5 to know characteristics data KD of the electric machine 3 before the parameter set PS is retrieved. In individual cases it is possible for the characteristics data KD to be known to the drive controller 5 via a drive interface 15 to the power component 2. However, generally an input is made by an operator 16 in accordance with the illustration in FIGS. 1 and 2. For example, the operator 16 of the drive controller 5 can input the characteristics data KD manually. It is also possible for the operator 16—for example using a smartphone or a reader—to read in a code of the electric machine 3 or to photograph the code or a rating plate of the electric machine 3 and to forward the code or photograph to the drive controller 5 via a corresponding app. In this case the drive controller 5 can determine the characteristics data KD of the electric machine 3 automatically by evaluating the code read in or the photograph forwarded. Where necessary, the drive controller 5 can furthermore also request further information about the electric machine 3 via a connection to the Internet. For example, the code and/or the rating plate may include a serial number of a type number, based on which the corresponding information about the electric machine can be traced on the Internet.

When the characteristics data KD of the electric machine 3 is utilized, the procedure in FIG. 3 is configured as is explained in greater detail below in connection with FIG. 4.

Figure 4:
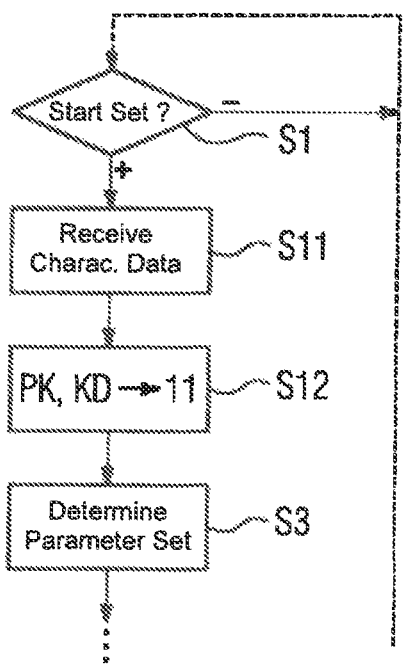

According to FIG. 4, step S2 is replaced by a step S12. Furthermore, a step S11 is arranged ahead of step S12. In step S11 the drive controller 5 receives—directly or indirectly—the characteristics data KD. In step S12 the drive controller 5 forwards not only the configuration identifier PK but in addition also the characteristics data KD to the data pool 11. Consequently the retrieved parameter set PS is—in addition to its dependence on the configuration identifier PK—also dependent on the characteristics data.

Furthermore, it is possible—alternatively or additionally to the embodiment according to FIG. 4—to embody the operating method in accordance with the illustration in FIG. 5. FIG. 5 here shows two different advantageous embodiments with the steps S21 to S25 on the one hand and S31 to S33 on the other hand, which can be implemented individually or together as required.

In step S21 the drive controller 5 checks whether a first condition is met. The first condition can be a time lapse, for example. Regardless of its specific embodiment, the first condition is however only met from time to time, for example once a day or once a week.

In step S22 the drive controller 5 forwards the configuration identifier PK and if appropriate also the characteristics data KD to the data pool 11 via the computer-to-computer interface 10. In step S23 the drive controller 5 receives the parameter set PS forwarded from the data pool 11. In step S24 the drive controller 5 checks, where necessary, whether the parameter set PS has been changed compared to the previously stored parameter set PS. If this is the case, the drive controller 5 parameterizes itself in step S25 in accordance with the newly retrieved parameter set PS. Alternatively it is possible for step S24 to be omitted and for the drive controller 5—where appropriate with unchanged parameters—always to carry out a reparameterization.

The one embodiment in FIG. 5 is terminated with step S25. When the one embodiment in FIG. 5 is involved, the drive controller 5 thus returns to step S5. During the renewed execution of step S5 the drive controller 5 determines the control commands C for the power component 2, but taking into account its new parameterization.

In step S31 the drive controller 5 checks whether a second condition is met. The second condition can be a time lapse, for example. Regardless of its specific embodiment, the second condition is however only met from time to time, for example once a minute or once an hour. In individual cases the second condition may be identical to the first condition. However, generally it is an autonomous condition.

In step S32 the drive controller 5 acquires operating data BD of the electric drive 1. The acquired operating data BD is forwarded by the drive controller 5 in step S33 to the data pool 11 via the computer-to-computer interface 10 and as a result is stored in the data pool 11. The operating data BD can include the parameter set PS in full or in part.

Summarizing, the present invention therefore relates to the following subject matter:

An electric drive 1 comprises a power component 2 and an electric machine 3 which is supplied with electrical energy via the power component 2. The power component 2 is embodied as an inverter. When a starting condition is met, a drive controller 5 for controlling the electric drive 1 retrieves a configuration-specific parameter set PS from a data pool 11 via a computer-to-computer interface 10, parameterizes itself in accordance with the retrieved parameter set PS and then determines control commands C for the power component 2 as a function of setpoint actuation states A* predefined for the drive controller 5, taking into account their parameterization, and actuates the power component 2 accordingly. The setpoint actuation states A* are setpoint currents.

The present invention has many advantages. In particular, it is easily, simply and reliably possible to parameterize the drive controller 5 correctly in situ. Furthermore, it is easily possible to keep the parameterization of the drive controller 5 up to date at all times. Finally the historical operating data BD of the drive controller 5 or of the electric drive 1 (where necessary, including the respective valid parameter set PS) is available at all times, for example for documentation purposes, without occupying excessive storage capacity in the drive controller 5. Finally a central—and also multi-drive and multi-manufacturer—evaluation of the operating data BD is possible with an optimization of the parameter set PS building thereon.

Although the invention has been illustrated and described in greater detail with the preferred exemplary embodiment, the invention is not restricted by the examples disclosed and other variations can be derived therefrom by the person skilled in the art without departing from the protective scope of the invention.

What is claimed is:

1. A method for operating a drive controller controlling an electric drive, said method comprising:
when a starting condition is met, the drive controller retrieving a configuration-specific parameter set from a data pool via a computer-to-computer interface,
parameterizing the drive controller in accordance with the retrieved parameter set, and
determining control commands for a power component having an inverter and an electric machine that receives electrical energy via the power component, as a function of setpoint currents defined for the drive controller and by taking into account the parameterization of the drive controller, and
controlling the power component with the control commands.

2. The method of claim 1, wherein the starting condition is met when the drive controller is connected to an energy supply, or when the drive controller is connected to the data pool via the computer-to-computer interface, or when no parameter set has yet been stored in the drive controller.

3. The method of claim 1, wherein characteristic data of the electric machine are made known to the drive controller before the configuration-specific parameter set is retrieved, and wherein the retrieved configuration-specific parameter set depends on the characteristic data.

4. The method of claim 1, wherein the drive controller checks from time to time via the computer-to-computer interface whether a new configuration-specific parameter set is stored in the data pool, retrieves the new configuration-specific parameter set from the data pool via the computer-to-computer interface, performs a new parameterization in accordance with the newly retrieved parameter set, and controls the power component as a function of the setpoint actuation currents defined for the drive controller, while taking into account the new parameterization.

5. The method of claim 1, wherein the drive controller acquires from time to time operating data of the electric drive and stores the operating data in the data pool via the computer-to-computer interface.

6. A control program for a drive controller controlling an electric drive which comprises a power component embodied as an inverter and an electric machine receiving electrical energy via the power component, wherein the control program comprises machine code embodied on a computer-readable non-transitory medium which, when loaded into a memory of the drive controller and executed by the drive controller, causes the drive controller to
when a starting condition is met, retrieve a configuration-specific parameter set from a data pool via a computer-to-computer interface,
perform a parameterization in accordance with the retrieved parameter set, and
determine control commands for the power component as a function of setpoint currents defined for the drive controller and by taking into account the parameterization of the drive controller, and
control the power component with the control commands.

7. A drive controller for an electric drive which comprises a power component embodied as an inverter and an electric machine receiving electrical energy via the power component, wherein the drive controller is configured to
when a starting condition is met, retrieve a configuration-specific parameter set from a data pool via a computer-to-computer interface,
parameterize the drive controller in accordance with the retrieved parameter set, and
determine control commands for the power component as a function of setpoint currents defined for the drive controller and by taking into account the parameterization of the drive controller, and
control the power component with the control commands.

8. An electric drive comprising
a power component embodied as an inverter and an electric machine receiving electrical energy via the power component, and
a drive controller configured to
when a starting condition is met, retrieve a configuration-specific parameter set from a data pool via a computer-to-computer interface,
parameterize the drive controller in accordance with the retrieved parameter set, and
determine control commands for the power component as a function of setpoint currents defined for the drive controller and by taking into account the parameterization of the drive controller, and
control the power component with the control commands.

* * * * *